United States Patent [19]

Lybarger et al.

[11] 3,868,998
[45] Mar. 4, 1975

[54] SELF-ACIDIFYING TREATING FLUID POSITIONING PROCESS

[75] Inventors: James H. Lybarger, Metairie, La.; Ronald F. Scheuerman, Bellaire; George Thomas Karnes, Houston, both of Tex.

[73] Assignee: Shell Oil Company, Houston, Tex.

[22] Filed: May 15, 1974

[21] Appl. No.: 470,089

[52] U.S. Cl................ 166/278, 166/307, 166/308
[51] Int. Cl... E21b 43/04, E21b 43/26, E21b 43/27
[58] Field of Search ........... 166/307, 308, 278, 280, 166/281, 282, 271, 300, 259, 250; 252/8.55 C

[56] References Cited
UNITED STATES PATENTS

| 2,118,386 | 5/1938 | Swinehart | 166/307 UX |
|---|---|---|---|
| 2,640,810 | 6/1953 | Cardwell et al. | 166/307 X |
| 2,689,009 | 9/1954 | Brainerd et al. | 166/307 |
| 3,417,820 | 12/1968 | Epler et al. | 166/308 |
| 3,475,334 | 10/1969 | Boudreaux | 166/308 X |
| 3,483,121 | 12/1969 | Jordan | 166/308 X |
| 3,543,856 | 12/1970 | Knox et al. | 166/307 X |
| 3,727,688 | 4/1973 | Clampitt | 166/307 X |
| 3,757,863 | 9/1973 | Clampitt | 166/307 |
| 3,765,488 | 10/1973 | Pence, Jr. | 166/308 |
| 3,828,854 | 8/1974 | Templeton et al. | 166/307 |

*Primary Examiner*—Stephen J. Novosad

[57] ABSTRACT

The positioning of a treating fluid such as an acidifying or particle-carrying fluid, in a subterranean location is improved by injecting a viscous aqueous solution that contains a cellulose ether, a fluoride salt and a relatively slowly reactive acid-yielding material, and subsequently becomes a substantially non-viscous weakly acidic liquid that is capable of dissolving silica.

15 Claims, 2 Drawing Figures

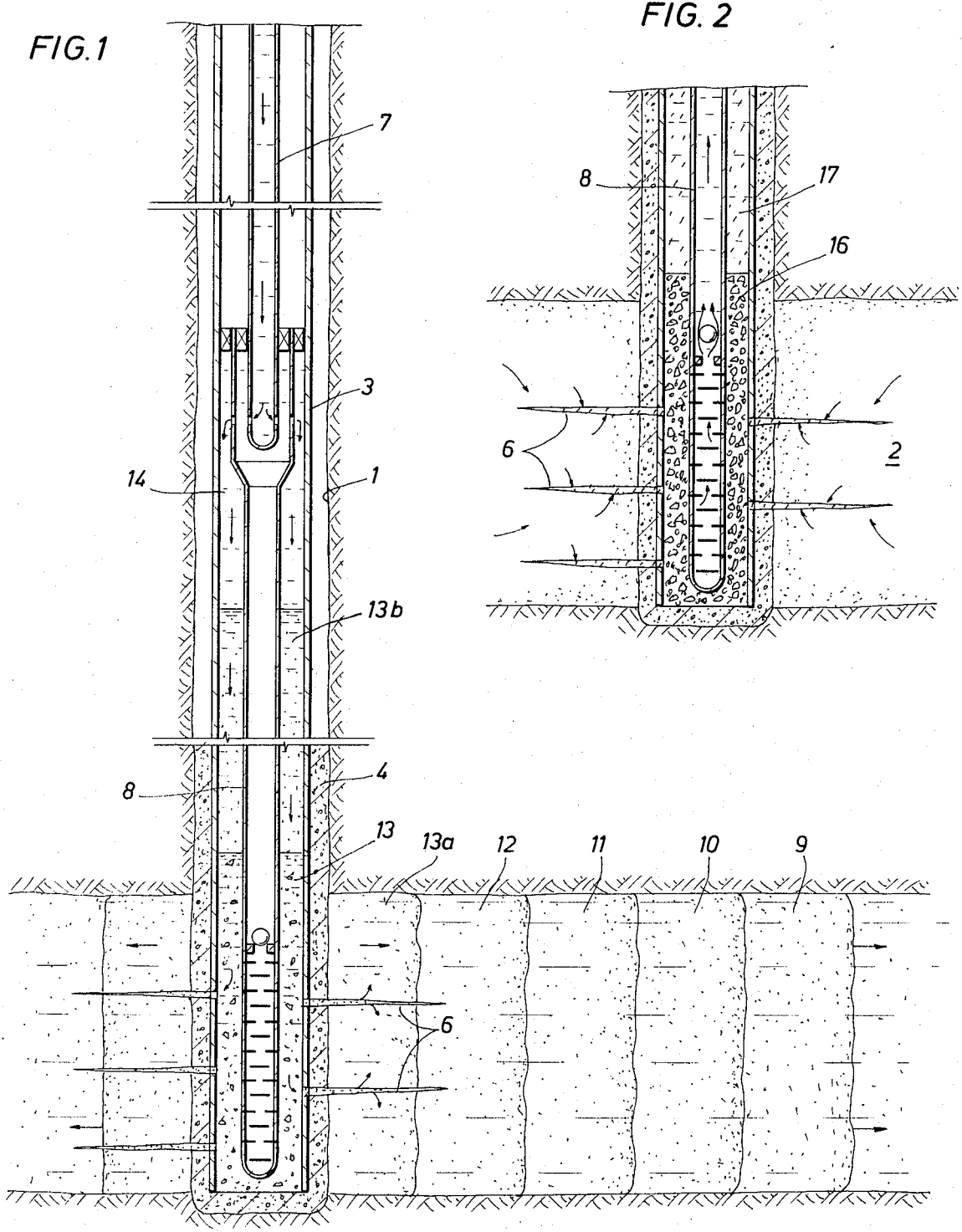

3,868,998

SELF-ACIDIFYING TREATING FLUID POSITIONING PROCESS

RELATED PATENT APPLICATION

The present invention is related to, but distinct from, the self-generating mud acid solution of the type described in the E. H. Street, C. C. Templeton, E. A. Richardson patent application, Ser. No. 411,132, filed Oct. 30, 1973, and now U.S. Pat. No. 3,828,854. The present invention involves a temporarily viscous solution in which those self-generating mud acid solution components are combined with a cellulose ether water thickener to provide a solution in which both an acidification and a viscosity-breaking occur in response to a time-temperature exposure that is attainable in the course of flowing a treating or carrying fluid into a selected subterranean location. The disclosures of the prior application are incorporated herein by cross reference.

BACKGROUND OF THE INVENTION

This invention relates to a well treating process for treating or emplacing material in a remote location such as a subterranean region in or around a well. It is particularly useful for emplacing a slurry of particles that form a sand or gravel pack in a well and/or a fracture in a subterranean earth formation; for displacing a viscous, low-fluid loss, slow-acting acidic solution along and into the walls of such a fracture; for temporarily diverting a fast-acting acid away from a zone that tends to act as a "thief-zone" in a permeability-profile-improving stimulation of an interval of inhomogeneously permeable earth formations; etc.

SUMMARY OF THE INVENTION

The invention relates to a process adapted for treating a well. A temporarily viscous solution is formed by dissolving in an aqueous liquid at least one each of a cellulose ether, a fluoride salt, and a relatively slow acting acid-yielding material. The compositions and proportions of the solution components are correlated with respect to the temperature of a selected remote location in which materials are to be contacted by the solution and the time required to flow the solution into that location. The solution is flowed into the selected location at a rate such that (a) the solution arrives before its viscosity has significantly decreased and (b) the materials in the selected location are contacted with a weakly acidic solution that is capable of dissolving either siliceous s or pH-sensitive material.

DESCRIPTION OF THE DRAWING

FIGS. 1 and 2 are schematic illustrations of portions of a well and an adjacent reservoir.

DESCRIPTION OF THE INVENTION

The invention provides a process for emplacing a self-cleaning mass or pack of particles in a subterranean location. Such packs are useful in cased or uncased well boreholes and/or perforation tunnels or openings in a well casing and a surrounding cement sheath and earth formation, or between the walls of a fracture within a subterranean earth formation. In forming such a pack, the particles preferably have sizes of from about 10 to 100 U.S. mesh sieve size. They are suspended in a temporarily viscous solution of this invention, and the suspension is displaced into the location to be packed before the solution becomes non-viscous. In this procedure the particle-suspending solution becomes a clay-dissolving weakly acidic solution that is present throughout the mass of particles. This is uniquely advantageous. It ensures the dissolving of any silica or other acid-soluble fine particles (e.g., fine sand or silt or clay-sized or smaller particles) that have been formed in or mixed with with the pack particles. Such fine particles are commonly formed by the crushing of grains passing through slurry injection pumps and/or formed in or entrained in the slurry by the abrasion or erosion of grains moving through conduits, the scraping-off or abrading of scale or metal particles from conduits, the mixing of the fluid-suspended pack grains with the grains of an unconsolidated reservoir formation (e.g., along the periphery of a gravel pack), etc.

The present invention also provides an improved process for acidizing a fracture while it is being formed and/or extended. Slugs of the present temporarily viscous solutions can be used (by themselves or in conjunction with other viscous acids, or the like) as the fluid injected for forming, extending, propping or treating a fracture. The temporarily high viscosity of the present fluids adapts them to move through a fracture with relatively small and relatively easily controllable amounts of fluid loss into the fracture walls. Their subsequent conversion to a non-viscous clay-dissolving weakly acidic solution both cleans and increases the permeability of the fracture walls and/or mass of fracture propping particles and makes it easy to remove subsequently mobilized treating fluid from the fracture and the fracture walls.

The invention also provides an improved acid-diverting procedure for ensuring the treatment of both the less permeable and the more permeable portions of an interval of earth formations of heterogeneous permeability. An injection of slugs of the present temporarily viscous fluid is alternated with slugs of a relatively fast-acting acid so that the viscous fluid slugs tend to preferentially enter and plug the more permeable or "thief" zones while diverting more of the fast-acting acid to the less permeable zones. The subsequent conversion of the present fluid to a non-viscous fines-dissolving weakly acidic solution is highly advantageous. It tends to remove the fines that may be formed by the acidizing of the natural cementing materials and prevent permeability reductions due to movements of such fines.

Cellulose ether water thickeneners suitable for use in this invention include substantially any acid-sensitive cellulose ethers, such as the hydroxyalkyl, carboxyalkyl, and lower alkyl cellulose ethers, typified by hydroxyethylcellulose, carboxymethylcellulose, methylcellulose, and the like, which are substantially completely aqueous-liquid-soluble cellulose ethers that form substantially completely aqueous-liquid-soluble hydrolysis products when they are hydrolyzed in an acidic aqueous liquid. The hydroxyethylcellulose "Natrosol," available from Hercules Powder Company, "J-164" from Dowell, or "WG-8" from Halliburton, are particularly suitable.

The water soluble fluoride salts used in the present process can comprise one or more of substantially any fluoride salt that is relatively water soluble. In various operations, such as sand or gravel packing operations in which it is not necessary to inject the self-acidifying liquid into relatively fine pores (such as those in a relatively tight reservoir), portions of undissolved fluoride salt can be suspended in the liquid system. The ammonium salts of hydrofluoric acid, i.e., ammonium fluoride and ammonium bifluoride, are preferred fluoride salts for use in the present process. As known to those skilled in the art, in using ammonium bifluoride, ($NH_4HF_2$) it may be desirable to add enough ammonia or ammonium hydroxide to provide substantially equimolar amounts of ammonium and fluoride ions. However, an excess or deficiency of ammonia or other alkaline material can be used to increase or decrease the initial pH of the self-acidifying liquid system where a relatively short or long delay is desirable with respect to the production of an acidic solution. In addition, a substantially neutral and/or relatively high-pH system can be buffered to remain at a selected pH for a selected time and temperature exposure. In such delay-imparting procedures it may be desirable to increase or decrease the proportion of the acid-forming ester of other reactant by an amount equivalent to that used up or not needed in neutralizing the excess of or deficiency of alkalinity.

The acid-yielding material used in the present invention can comprise one or more of substantially any water-reactive esters (e.g., hydrolyzable at moderate temperatures, such as about 100° to 300°F) of a relatively water-soluble acid such as a carboxylic acid, phosphorus or sulphurus acid or its like. Examples of suitable esters include the lower aliphatic alcohol (e.g., $C_{-}5$) esters $C_{1-the\ lower\ fatty\ acids\ (C_1-5)}$ such as those ranging from methyl formate through amyl valerate; the similar alcohol esters of hydroxyacetic acid, oxalic acid and the like substituted and/or polybasic acids; etc. Examples of other suitable acid-yielding materials include hydrolyzable organic halides of the type described in the Dilgren and Newman U.S. Pat. Nos. 3,215,199, 3,297,090 and 3,307,630, such as the normal or isopropyl chlorides, tertiary-buytl chloride, allyl chloride, crotyl chloride, etc.; hydrolyzable sulphonic acid esters, such as methyl benezene sulphonate; and the like. The water-soluble alcohol esters of water-soluble aliphatic carboxylic acids having dissociation constants of from about $10^{-2}$ (oxalic) to $10^{-6}$ (butyric) are preferred. Halogen-containing materials should not be used in situations in which halogenated organic materials might become dissolved in or entrained in produced crude oil that will be sent to the refinery.

Where an initial high rate of reaction is desirable within the temporarily viscous solution, a relatively small proportion of a strong acid, such as hydrochloric acid can be added. This provides the relatively fast reaction rate of a conventional mud acid, until strong acid has been depleted.

The aqueous liquid used in forming the present self-acidifying liquid system can comprise substantially any relatively soft, brackish, fresh or pure water. Multivalent cations tend to precipitate fluoride ions and increasing concentrations of dissolved salt tend to decrease the solubility of siliceous materials in a hydrofluoric acid-containing solution. Because of this, a soft water that is at least as pure as fresh water is preferred. However, chelating or sequestering agents can be used to mitigate the effects of multivalent cations.

In general, the concentration of the cellulose ether water thickener can be varied substantially as desired to obtain the selected degree of temporarily high viscosity. The proportion of dissolved cellulose material can range from about 0.1 to 4% by weight of the solution to provide viscosity which (at normal surface temperatures of about 80°F) can range from about 100 to 51,000 centipoise, such as those which characterize relatively viscous pumpable fluids. Where relatively large particles are to be suspended in such fluids, the viscosities are preferably adjusted to be relatively high, e.g., by using a relatively high proportion of cellulosic material.

The concentrations of the fluoride salt and the acid-yielding reactant can also be varied relatively widely. For an effective dissolution of siliceous materials, it is desireable that the concentration of hydrogen fluoride in the liquid become equivalent to at least 0.1 mole per liter, and preferably, from about 1 to 2 moles/liter. The ratio of the acid-yielding material to the fluoride salt is preferably at least about equimolar in order to release all of the available hydrogen fluoride. Molar ratios of the acid-yielding material to the fluoride salt of from about 1.5 to 2.5 are preferred.

As known to those skilled in the art, the severity of the time-temperature exposure of reactive materials, such as the present temporarily viscous aqueous solutions, are increased by increases in either the degree of the temperature exposure for a given time, or the duration of the exposure at a given temperature. In a well treating operation, it is not usually feasible to make significant changes in the temperature of the subterranean location to be treated (or the conduit extending from it to a surface location) although some change can sometimes be made injecting a relatively hot or cold fluid. In addition, except in a fracturing operation, the rate at which fluid is pumped from a surface location to the subterranean location, is generally limited by the rate at which fluid can be flowed into the pores of the earth formation in response to a pressure less than the fracturing pressure. In formulating the present temporarily viscous solutions, the composition and proportions of the solution component are preferably arranged to provide a viscosity reduction in response to a time-temperature exposure that can feasibly be attained in pumping that solution into the particular subterranean location to be treated.

FIG. 1 illustrates a particularly suitable procedure for utilizing the invention. It shows a well having a borehole 1 completed into a subterranean reservoir 2. The well contains a string of casing 3 surrounded by a sheath of cement 4 and penetrated by perforations 6 that provide openings into the reservoir. A tubing string 7 connected to a screen or perforated liner 8 (with the appropriate packing, hanging and crossover devices, etc.) for a gravel packing operation, has been inserted within the casing.

As indicated by the arrows, fluid is pumped through the tubing string and into the reservoir. The injected fluid preferably comprises a series of individual portions or slugs. The slugs shown should be preceded by a slug of fresh water or an aqueous solution of an ammonium salt, such as ammonium chloride, where needed to displace any reservoir water that contains a significant amount of alkali metal or alkaline earth metal salts. Slug 9 is a pre-formed mud acid such as a self-neutralizing mixture of hydrochloric and hydrofluoric acids and a pH-increasing reactant. Such self-neutralizing acid solutions are more completely described in the E. A. Richardson, R. F. Scheuerman patent application Ser. No. 274,778 filed July 24, 1972, now U.S. pat. No. 3,826,312. The disclosures of that application are incorporated herein by cross reference. The disclosures of the prior application are incorporated herein by cross-reference.

Slug 10 is a spacer fluid, such as a relatively dilute aqueous solution of ammonium chloride. Slug 11 is a SGMA (self-generating mud acid) of an aqueous solution of a fluoride salt and an acid-yielding material (of the type described in the above-identified copending patent application Ser. No. 411,132, and now U.S. Pat. No. 3,828,854). Slug 12 is a present temporarily viscous self-generating mud acid solution free of gravel packing particles. Fluid 13a is a filtrate from fluid 13, which is a slurry of gravel packing particles suspended in a temporarily viscous self-generating mud-acid solution of the present invention. The filtrate 13a (which comprises a temporarily viscous solution) flows into the formation as the suspended grains are screened-out against the formation. Fluid 13b is a supernatent liquid portion of slurry 13 (comprising a temporarily viscous solution) from which packing particles have settled out as the slurry stands, or flow relatively slowly, in the borehole. The slurry 13 is preferably displaced into the desired location by an inert (or subsequently neutralizing) displacing fluid 14, such as an aqueous solution of an ammonium halide.

FIG. 2 shows the same portion of the well at a later stage, at which time fluid is being flowed into the wall, or produced, from the reservoir 2. In this stage the well contains a gravel pack 16 formed by the particles that were transported by the slurry 13. As shown by the arrows, the produced fluid tends to enter the gravel pack 16 and move directly into adjacent openings in the screen or liner 8. Therefore, the production of fluid from the reservoir leaves a substantially undisturbed column of fluid 14 and/or 13b standing above and/or in the upper portion of the gravel pack 16.

Since fluid 14 is apt to be or be mixed with a substantially non-viscous, but relatively weakly acidic liquid that is subsequently formed by the self-conversion of the supernatent temporarily viscous fluid 13b (shown in FIG. 1), the fluid 14 can advantageously contain a pH-increasing reactant to subsequently reduce the corrosivity of the acidic liquid.

The flow patterns of fluid injected or produced through such gravel packs are such that the self-cleaning aspect of the present process is uniquely advantageous. The in-situ conversion of the particle-suspending fluid to a mud acid ensures the dissolving of substantially all the accumulated silt-sized or clay-sized fine particles that have become entrained within or along the peripheries of the pack. The perforations through which fluids can flow between the well and the reservoir are, in effect, parallel flow paths. Therefore, if one such path is plugged, most or all of the flow proceeds through the other. Because of this, a mud acid that is injected after the emplacement of pack 16 is seldom effective for dissolving fines throughout the body of the pack, or along the interfaces between the openings through the perforations 6 and the associated perforation tunnels and the face of the reservoir. Such a fines-dissolving action throughout all of a pack of particles is, however, effectively accomplished by the present process of forming an acid by a chemical conversion of the grain-suspending fluid while it is distributed throughout the pack.

Well Treating Temporarily Viscous Solution

A temporarily viscous solution for use in treating a well in which the temperature in the location in which materials are to be contacted by the fluid is about 150°F is exemplified by a solution composed of the following:
852 gallons of fresh water
65 pounds of hydroxyethylcellulose (such as "Natrosol")
205 pounds of ammonium bifluoride
28 gallons of 30% aqueous ammonium hydroxide
107 gallons of methyl formate.

The methyl formate component is preferably not added to the solution until immediately before pumping.

Such a solution preferably contains a corrosion inhibitor. Examples of suitable inhibitors include ammonium compounds, such as thiourea, quaternary ammonium salts, heterocyclic nitrogen compounds, rosin amines or the like; inorganic compounds such as arsenic derivatives; unsaturated materials such as acetylenic alcohols; the corrosion inhibitors available as MSA-Inhibitors from Halliburton, E–878 inhibitors from Dowell; and the like.

Other additives such as reducing agents, chelating agents, wetting agents and the like can be included in such a solution as long as they do not interfere with the cellulose ether-hydrolyzing and mud acid-generating reactions of the present invention.

Gravel Packing Well Treating Process

A particularly suitable procedure for gravel packing a well that is completed (with an open hole, or a perforated casing or liner or the like) into a reservoir having a temperature of about 150°F is exemplified by the following. The equipment and the sequence of fluids used are preferably those shown in FIG. 1, and preferably follow a displacing or dissolving of any potentially interferring minerals, such as alkaline earth metal carbonates, or fluids—such as residual oil and/or aqueous solution of alkali metal or alkaline earth metal salts, etc.

Fluid 9; — 1,000 gallons self-neutralizing mud acid comprising an aqueous solution containing 7.5% hydrochloric acid, 1.5% hydrofluoric acid and about 2 moles/liter urea;

Fluid 10; — 2 barrels of aqueous 3% ammonium chloride solution;

Fluid 11; — 2 barrels self-generating mud acid solution (in which solution 852 gallons of fresh water are mixed with 207 pounds of ammonium bifluoride, 28 gallons of 30% aqueous ammonia solution and 107 gallons of methyl formate);

Fluid 12; — 3 barrels of the above-described Well Treating Temporarily Viscous Solution containing about 3% by weight of ammonium chloride;

Fluid 13; — 10 barrels of a suspension of about 15 pounds per gallon gravel packing sand, such as Ottawa 40–60 US mesh silica sand, in the above-described Well Treating Temporarily Viscous Solution; and Fluid 14; — 2 barrels of aqueous 3% ammonium chloride solution containing about 2 moles/liter urea.

The above train of fluids is preferably displaced through the tubing string 7 ahead of fluid 14 so that the leading edge of fluid 14 flows through the tubing string cross-over and into the annulus between the tubing and casing above the uppermost perforation 6, while the trailing edge remains in the tubing string 7 above the crossover device. The so-treated well is preferably allowed to stand for about 24 hours and then returned to production.

In using the present temporarily viscous solutions to emplace a self-cleaning mass or pack or particles the particles which can be used include substantially any that are relatively strong and are inert or slowly reactive with respect to a weakly acidic solution capable of dissolving clay or silica. Such particles preferably have sizes of from about 10 to 100 US mesh and are preferably relatively well-rounded grains or granules. Examples of suitable particle materials include siliceous sand or gravel, walnut shells, glass beads, comminuted resins, or the like. When a pack of relatively well-rounded siliceous sand grains having sizes at least as large as 60 mesh is emplaced in a wellbore as described above, the silica-dissolving action of the present weakly acidic fluid (which is self-generated throughout the pack) tends to remove any entrained siliceous or weak acid-reactive fine materials without causing any adverse effect, such as a significant loss of volume or strength, within the pack.

What is claimed is

1. A well treating process comprising:
   dissolving in an aqueous liquid at least one each of a cellulose ether, a fluoride salt and a relatively slowly reactive acid-yielding material, to form a pumpable viscous solution;
   arranging the composition and proportions of the components of the solution with respect to the temperature of a selected subterranean location in which materials are to be contacted by the fluid and the time required to pump fluid from a surface location to the subterranean location; and
   pumping fluid inclusive of the temporarily viscous solution from a surface location to the selected subterranean location at a rate such that the viscosity of the temporarily viscous solution remains relatively high until the solution has substantially reached the selected location and, in that location, the temporarily viscous solution is or becomes a weakly acidic liquid that is capable of dissolving siliceous material.

2. The process of claim 1 in which particles adapted to form a sand or gravel pack or fracture propping mass of particles are suspended in the temporarily viscous solution.

3. The process of claim 2 in which a gravel pack is formed by pumping particles suspended in the temporarily viscous solution into the space between a well screen or perforated liner and the earth formations around the well.

4. The process of claim 3 in which the suspension of particles in the temporarily viscous solution is preceeded by an acidic liquid that contains a relatively slowly reactive pH-increasing reactant ahead of an aqueous solution of a fluoride salt and acid-yielding reactant in proportions adapted to form a weakly acidic solution capable of dissolving siliceous material.

5. The process of claim 3 in which the suspension of particles in the temporarily viscous solution is followed by an aqueous solution containing a relatively slowly reactive pH-increasing reactant.

6. The process of claim 1 in which a fracture in a subterranean earth formation is acidized by pumping at least one portion of the temporarily viscous solution into the fracture.

7. The process of claim 6 in which the temporarily viscous solution is allowed to remain substantially static in and around the fracture for at least as long as required to convert substantially all of the acid-yielding material in the solution to an acid.

8. The process of claim 1 in which an alternating sequence of at least one slug of the temporarily viscous solution and at least one slug of a relatively rapidly-reactive acid is injected into an inhomogeneously permeable interval of subterranean earth formations so that at least one slug of temporarily viscous solution tends to preferentially enter a relatively permeable zone and divert a following slug of the relatively rapidly-reactive acid into a less permeable zone.

9. The process of claim 1 in which the cellulose ether, fluoride salt, and acid-yielding materials are, respectively, hydroxyethylcellulose ether, an ammonium salt of hydrofluoric acid, and methyl formate.

10. In a process in which fluid is positioned in a selected remote location by forming a temporarily viscous fluid and flowing it into the selected location before the viscosity of the fluid is significantly reduced, the improvement comprising;
    dissolving in an aqueous liquid at least one each of a cellulose ether, a fluoride salt, and a relatively slowly reacting acid-yielding material;
    arranging the solution components to provide a self-acidifying, temporarily viscous solution in which the viscosity is significantly reduced in response to a time-temperature exposure of a selected severity; and
    flowing the self-acidifying solution into the selected location at a rate causing it to arrive at least substantially as soon as it has received a time-temperature exposure of the selected severity.

11. The process of claim 10 in which the selected location is a subterranean region in contact with earth formations in or around the borehole of a well.

12. The process of claim 11 in which particles adapted to form a sand or gravel pack or fracture propping mass of particles are suspended in the self-acidifying solution.

13. The process of claim 12 in which a gravel pack is formed by pumping said suspension into the borehole of a well.

14. The process of claim 13 in which said suspension is pumped into the well behind an acidic liquid that contains a relatively slowly reactive pH-increasing reactant ahead of an aqueous solution of a fluoride salt and acid-yielding reactant in proportions adapted to form a weakly acidic solution capable of dissolving siliceous material.

15. The process of claim 14 in which said suspension is pumped into the well immediately ahead of an aqueous solution containing a relatively slowly reactive pH-increasing reactant.

* * * * *